United States Patent [19]

Kimball

[11] Patent Number: 4,783,999
[45] Date of Patent: Nov. 15, 1988

[54] VIBRATION TEST APPARATUS AND BEARING THEREFOR

[75] Inventor: David V. Kimball, Monrovia, Calif.

[73] Assignee: Kimball Industries, Inc., Monrovia, Calif.

[21] Appl. No.: 44,590

[22] Filed: Apr. 30, 1987

[51] Int. Cl.⁴ .............................................. G01M 7/00
[52] U.S. Cl. ......................................... 73/665; 384/12
[58] Field of Search ............................ 73/665; 384/12

[56] References Cited

U.S. PATENT DOCUMENTS

| 3,242,724 | 3/1966 | Ceparano et al. | 73/665 |
| 4,107,643 | 8/1978 | Rhodes | 73/665 |
| 4,192,190 | 3/1980 | Kimball | 73/665 |

Primary Examiner—John Chapman
Attorney, Agent, or Firm—Louis J. Bachand

[57] ABSTRACT

Hydrostatic bearing vibration test apparatus in which the pillow block housing is opertively coupled to the workpiece by an oil film while the carriage blocks are fixed to the workpiece and the bearing shaft, the housing being supported on flexible bolts permitting two degrees of freedom in the bearing appartus.

53 Claims, 3 Drawing Sheets

VIBRATION TEST APPARATUS AND BEARING THEREFOR

TECHNICAL FIELD

This invention has to do with improvements in hydrostatic journal bearings, in vibration test equipment incorporating such hydrostatic journal bearings, and in methods of using hydrostatic journal bearings including testing articles. More particularly, the invention relates to provision of added damping and stiffness in longer stroke hydrostatic journal bearings such as those used to support and guide slip gates in vibration testing of parts and assemblies for reliability and optimization of design and manufacture.

BACKGROUND OF THE INVENTION

Hydrostatic journal bearings typically comprise a pillow block or housing and a shaft, and means connecting the housing or shaft to a moving element which is to be guided or supported by the bearing. Such apparatus has been used in vibration testing equipment for a number of years. In a typical arrangement, the housing was connected to the slip plate or other workpiece and the shaft journaled in the housing was supported by stationary blocks affixed to a reference base.

As compared with past devices, the present apparatus provides higher static load capability, higher dynamic load capability, increased stroke length with no reduction and actually an increase in the oil film damped area for improved dynamic response at high frequencies of vibration, absence of internal oil flow porting of slip plates and its expense and potential for interfering with test article attachment, avoidance of external hoses between the oil supply and the slip plate/table interface to create the oil film, increased pitch, yaw and roll dynamic overturning moments, freedom from O-ring seals at the bearing housing slip/plate interface for oil feed so that minimum slip plate size is no longer a consideration, and ready alinement, adjustment and replacement of the apparatus.

It is accordingly an object of the invention to provide apparatus having the foregoing features.

SUMMARY OF THE INVENTION

In general, the invention provides in vibration test apparatus a hydrostatic journal bearing in which the pillow block or housing is not connected to the slip plate as formerly, but is positioned in spaced relation to the slip plate and spaced from the base, so as to define a damping enhancing oil film at the slip plate. The slip plate is fixed to carriage blocks which in turn are fixed to the bearing shaft, so that the carriage blocks, and not the housing move with the slip plate. The housing surface thus can carry an oil film and enhance the damping of the slip plate vibration. The stroke of the bearing can be increased since the aperture necessary to accommodate the greater stroke while larger is not lost area for purposes of damping, the housing surface within the aperture being available for damping as noted. The mounting of the housing to the base is adjustable in height and uniquely variable so as to have either one or two degrees of freedom in the bearing. Thus in addition to the usual degree of freedom in the axial direction of the shaft, another, second degree of freedom, normal to the first is available, to accommodate thermal expansion of the slip plate for example. The feeding of oil to the slip plate granite block interface by hoses passed upwardly from a pressurized oil supply, and thence to a long bore in the slip plate for distribution to the surface area and to the bearings which has caused problems is past designs is avoided by keeping the oil path within the apparatus, by first feeding the housing bore and then feeding oil from there upward to the housing surface and thence to the slip plate without use of external hoses. Other features are identified below.

In particular the improvements in accordance with the invention are realized in vibration test apparatus having an extended stroke and improved stiffness for use with a plate mounting a test article for vibration testing, wherein the apparatus comprises a hydrostatic journal bearing plate guide having a housing mounted on a base, a shaft shiftable axially in the housing, carriage block means for connecting the shaft to the plate for movement relative to the housing in a plane including the shaft axis, and oil film means for operatively coupling the plate and a surface of the housing in vibration damping relation.

In this embodiment there is further provided an oil-pressurized bore in the housing in which the shaft is shiftable; a pressurized oil supply, and passage means for pressurized oil to the bore defined by the and a housing surface; the carriage block means comprises carriage blocks on either side of the housing, disposed normally to the plane of the oil fed housing surface; the shaft is preferably tubular chrome-plated steel; the housing surface is preferably cast iron having a higher porosity to oil than the plate; the carriage block means is free of attachment to the base, the housing is free of attachment to the plate, and the apparatus having first and second degrees of freedom; the axial shifting of the shaft defines the apparatus first degree of freedom, and there is also included selectively deflectable means mounting the housing to the base for movement of the apparatus in a direction normal to the axial shifting of the shaft as a second degree of freedom for the apparatus; there is further included a series of elongated bolts mounting the housing to the base in spaced relation for accommodating the second degree of freedom as a function of the flexibility in the bolts; and means selectively tensioning the bolts in bolt flexibility decreasing relation.

In this and like embodiments there is also included a housing oil feed passage from the bore to the housing surface.

In a more preferred embodiment there is provided a vibration test apparatus having an extended stroke and improved stiffness for use with a plate mounting a test article for vibration testing, comprising a hydrostatic journal bearing plate guide having a housing mounted on a base, a shaft shiftable axially in the housing, carriage block means for connecting the shaft to the plate for movement relative to the housing parallel to the shaft axis and oil film means including a pressurized oil supply and a housing oil flow passage from the supply to a surface of the housing opposite the plate whereby the surface is operatively coupled to the plate in vibration damping relation.

In this and like embodiments there is a bore in the housing in which the shaft is shiftable, the bore is oil pressurized by the pressurized oil supply; the housing passage being flow restricted against full oil supply flow at the surface; the carriage block means comprises carriage blocks on either side of the housing, mounted transversely on the shaft, the relative spacing of the carriage block means defining the stroke of the apparatus; the carriage block means is free of attachment to the base, and the housing is free of attachment to the plate, the apparatus having first and second degrees of freedom; axial shifting of the shaft defines the apparatus first degree of freedom and there is also selectively deflectable means mounting the housing to the base for movement of the apparatus in a direction normal to the axial shifting of the shaft as a second degree of freedom for the apparatus; there is also a series of elongated bolts mounting the housing to the base in spaced relation for accommodating the second degree of freedom as a function of housing deflection provided by the flexibility in the bolts, and also threaded adjustment means thread adjustable between the base and the housing in opposition to the elongated bolts for variably tensioning the bolts in bolt flexibility decreasing relation.

As in previous embodiments the shaft is preferably tubular chrome-plated steel, and the housing formed of cast iron having a porosity to ail for maintaining an oil lubricity between the housing surface and the plate and between the shaft and the housing bore.

There is further included an oil distribution means on the housing surface in open communication with the housing passage.

In another aspect of the invention the foregoing vibration test apparatus is provided in combination with static support means for the plate, the static support means comprising a table adapted to underlie the plate, the hydrostatic journal bearing guide being within the perimeter of the table in dynamic supporting relation with the plate.

In such embodiments, the table defines a through opening extending between the base and the plate, the apparatus bearing guide being positioned in the opening; the housing oil flow passage extends from a housing bore journaling the shaft to the housing surface opposite the plate; the housing surface is spaced from the table and the oil film means further includes means to transfer oil between the table and the housing surface, the means comprising an oil impervious web extending between the housing and the table.

This embodiment is further provided in combination with a test article support plate, the plate having a pattern of grooving opposite the table to define an oil flow path across the table between the table and the plate. In such embodiments the housing passage terminates in a housing surface port, the plate grooving registering with the port in oil flow facilitating relation from port to table. This embodiment can further include a plurality of the housing ports in spaced relation, the plate having separate patterns of grooving in registration with one or another of the ports; the port being longitudinally extended beyond the passage in the housing surface; flow restriction means at the housing port to limit oil flow to the housing surface to that needed to maintain a predetermined desired oil film covering the pillow block housing surface between the plate and the housing and table respectively, and also a web extending between the housing and the table in oil carrying relation.

For use with vibration test apparatus described herein the invention further provides a plate adapted to carry a test article in table supported relation fixed to carriage block means joined to a hydrostatic journal bearing shaft movable translationally in a housing, the housing having an oil passage terminating in housing surface port means, the plate having discontinuous patterns of oil distributing grooving opposite the housing and table, each of the means being separately adapted to continuously register with the housing surface port means. In particular embodiments the plate has noncommunicating left and right hand grooving patterns, the housing having left and right hand port means arranged whereby each of the grooving patterns registers with its respective housing port means only.

In another aspect of the invention there is provided a hydrostatic journal bearing adapted for supporting a test article-carrying slip plate in guiding relation, the bearing comprising a pressurized oil supply, a pillow block housing having an oil pressurizable bore and an oil film-covered surface opposed to the slip plate, a shaft journaled in the bore, and carriage block means for carrying the slip plate, the carriage block means being mounted on the shaft and fixed to the slip plate, the pillow block housing being movable relative to the slip plate and operatively coupled therewith through the oil film in vibration damping relation.

Typically, the pillow block housing surface comprises an oil retaining porous cast iron; the shaft comprises tubular steel; there is a plurality of mounting bolts mounting the pillow block housing to a base in adjustably spaced relation to the slip plate; the mounting bolts extending from the pillow block to the base, the bolts being thread connected to the base and the pillow block housing, whereby the spacing between the pillow block and the base is thread adjustable; the pillow block housing is generally rectangular in a plane parallel to the longitudinal axis of the shaft, the mounting bolts are located one at each of the corners of the pillow block, and including also bolt tensioning means adapted to bodily shift the pillow block housing against the force of the mounting bolts, the tensioning means being located between adjacent mounting bolts; the tensioning means is thread adjustable relative to the pillow block housing and adapted to bear against the base in mounting bolt tensioning relation; and seating means is provided for the tensioning means at the base.

Additionally, the carriage block means typically comprises first and second carriage blocks opposed to opposite ends of the pillow block housing bore; the carriage block means define a split bore for receiving the shaft, there are fasteners to close the split bore against the shaft; the pillow block housing surface and the housing bore are in open communication with the oil supply and each other, whereby the housing bore is pressurized and the housing surface is fed film forming amount of oil; the pillow block housing defines a passage from the bore to the surface for oil flow from the bore to the surface, the passage being restricted to meter oil flow to the housing surface to an amount operatively coupling the slip plate and the housing surface in damping relation without increasing the predetermined spacing between the the plate and the housing surface; the bore defines a central annulus, the oil supply feeding the annulus to oil pressurize the bore, the passage intersecting the bore in oil flow receiving relation.

The foregoing hydrostatic journal bearing is provided also in combination with a slip plate, and a static slip plate support comprising a polished granite, and means passing oil from the supply from the housing surface to between the granite support and the slip plate.

In yet another embodiment there is provided vibration test apparatus comprising an apertured granite block adapted to support a slip plate in oil-damped relation, and a hydrostatic journal bearing within the block aperture operatively coupled to the slip plate by an oil film, whereby the block non-damped portions of the slip plate corresponding to the apertured areas of the block are damped by the housing oil film, whereby the nondamped area of the slip plate is smaller than the area of the block aperture.

In a highly particularly preferred embodiment there is provided a vibration test apparatus comprising a granite block having at least one journal bearing receiving aperture and a smooth surface surrounding the aperture, the surface being adapted to support a slip plate in sliding relation coupled to a vibration source, a base supporting the granite block, at least one hydrostatic journal bearing in an aperture of the granite, the hydrostatic journal bearing being smaller than the aperture to define therewith an aperture clearance and comprising a pillow block housing defining a bore and a surface opposite the slip plate, a shaft journaled in the bore, an oil supply adapted to supply oil under pressure to the bore, an oil passage through the housing between the bore and the housing surface, the passage being adapted to convey oil at reduced rates of flow from the bore to the housing surface; carriage blocks at either side of the housing fixed to the shaft at a predetermined combined clearance relative to the housing of not less than 2.5 inches, the carriage blocks being fixed to the slip plate in a manner elevating the slip plate slightly above the granite block, the housing surface being lower than the height of the slip plate to define a gap, a continuously flowing oil film filling the gap with oil from the passage, the oil film operatively coupling the housing and the slip to damp the slip plate vibration at the housing surface, a pair of oil transferring webs carried by the housing in sliding contact with the granite block surface opposite the slip plate for transferring oil flowing on the housing surface across the aperture clearance to the granite in slip plate movement facilitating relation, longitudinally extended trough means in the housing surface, grooving in the slip plate surface opposite, the trough and grooving being continuously in registration for movement of flowing oil from the trough to the slip plate grooving in web supported relation across the aperture clearance to damp the slip plate beyond the apertures; the housing being mounted to the base in spaced relation to the slip plate by a series of mounting bolts adapted to adjust the gap width, the mounting bolts being flexible over their exposed length between housing and base to permit transverse shifting of the housing within the aperture as well as axial motion of the shaft within the aperture, whereby the bearing has two degrees of freedom, and means to block the transverse motion by tensioning the bolts.

The invention further provides the method of vibration testing a test article which includes supporting the article for vibratory motion on a plate, connecting the the plate to a hydrostatic journal bearing in supporting and guiding relation, forming an oil film on the plate-opposing surface of a hydrostatic bearing housing, coupling a pair of carriage blocks between the hydrostatic bearing shaft and the plate in a manner defining a gap between the plate and the housing surface, and movably supporting the plate on the oil film, whereby the vibration induced in the plate is damped by the housing surface oil film.

Additionally there is provided the method of mounting to a base a hydrostatic journal bearing having a housing, a shaft journaled in the housing, and carriage blocks fixed to a workpiece, including connecting the bearing housing to the base by elongated connectors which flex between the base and the housing responsive to lateral forces on the workpiece to permit motion of the housing normal to the motion axis of the bearing shaft, and also controlling the housing motion by adjustably tensioning the connectors between the base and the housing in flexibility reducing relation.

THE DRAWING

The invention will be further described as to an illustrative embodiment in conjunction with the attached drawing in which.

PREFERRED MODES

A signal feature of the invention apparatus applied to use in vibration equipment is the operative coupling of the slip plate to the housing surface by a continuously formed oil film, such that these elements interact with each other, the effect being a damping of the slip plat in the area of the granite aperture which heretofore has been a void and undamped, with the result that as a vibration test device, the invention provides better dynamic response of the slip plate at high frequencies and better high load support at low frequencies.

A further feature is the availability of first and second degrees of freedom, a result of the mounting technique for the housing which permits lateral deflection under such influences as thermal expansion or contraction of the slip plate, as a function of relatively flexible or inflexible set screws cooperating with the housing mounting bolts.

Yet another feature is an increased stroke without loss of damped area, and the available use of an increased diameter shaft for better stiffness in the bearing. Heretofore larger shafts were often infeasible because the commensurate enlargement of the housing bore left the housing walls too frail for the high pressures in the bore needed to hydrostatically balance the shaft in the bore. The housing walls could not be increased in thickness without increasing the size of the granite apertures, and thus again the amount of undamped area under the slip plate. The present design retains the needed wall thickness without undue loss of damped area by virtue of the housing surface oil film.

Figure 1:
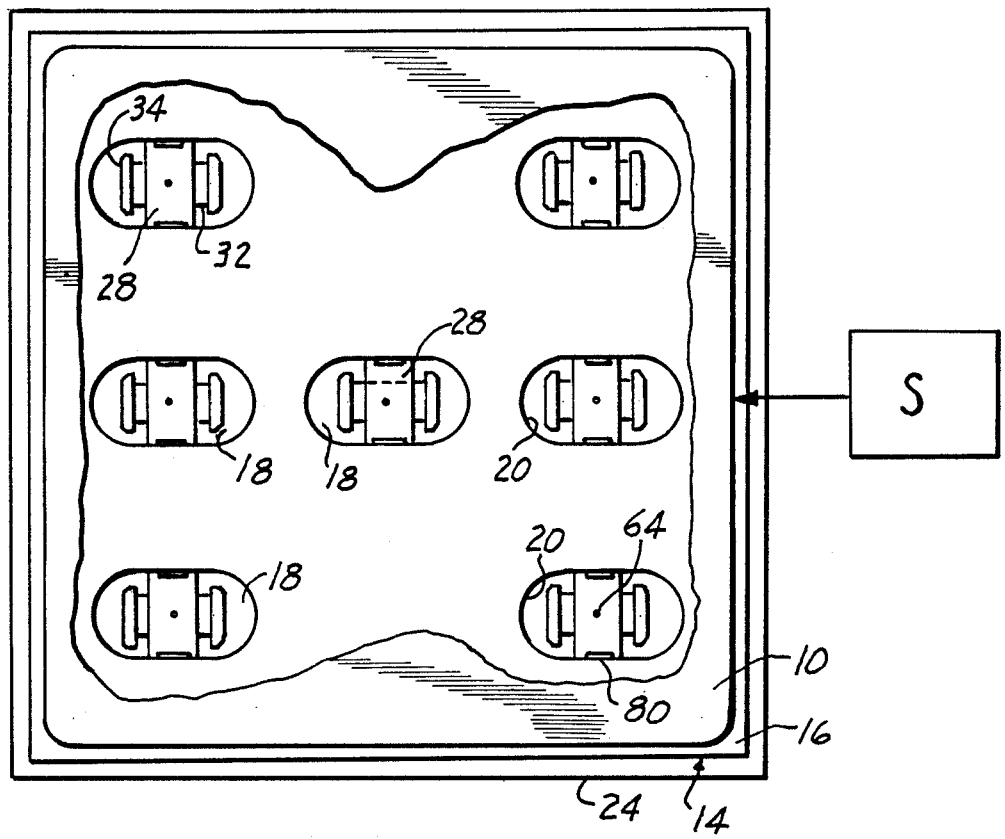
FIG. 1 is a top plan view of vibration test equipment havin the invention hydrostatic journal bearings installed.
Figure 2:
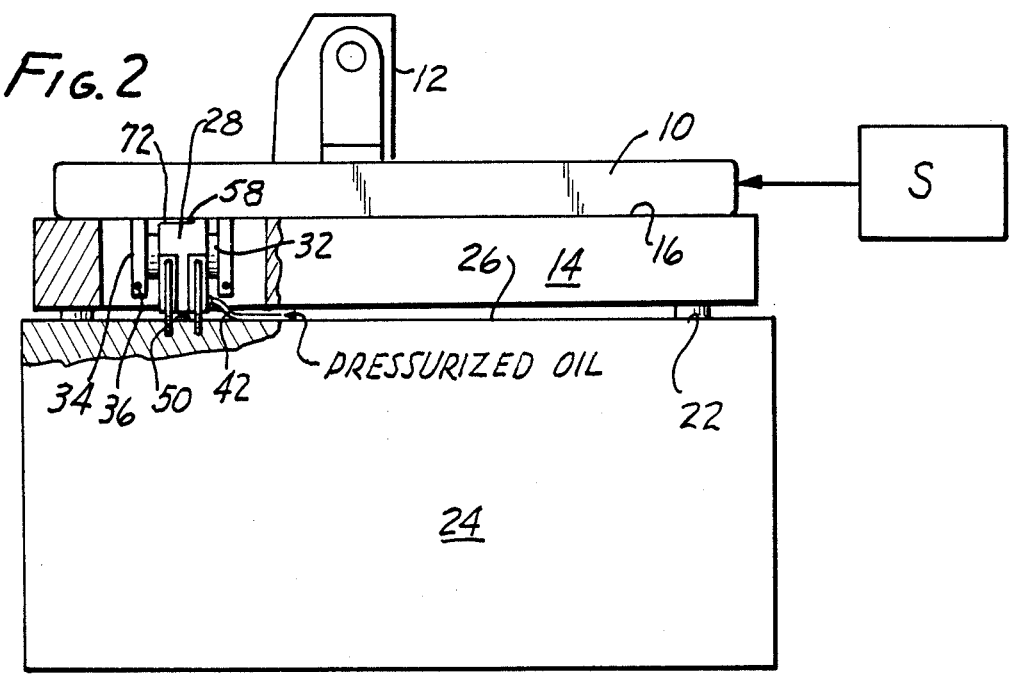
FIG. 2 is a side elevation of the equipment shown in FIG. 1, partly broken away to show underlying parts.

With reference now to the drawings in detail, in FIGS. 1 and 2 a source of vibration shown schematically as electrodynamic shaker S is connected by conventional means not shown, such as a driver bar, to a slip plate 10, typically made of magnesium or aluminum. A test article 12 which may be of any suitable configuration is mounted on the slip plate 10. The slip plate 10 is supported statically and dynamically by a granite table 14 having a smoothly polished surface 16 and a series of hydrostatic journal bearings 18 distributed as shown beneath the slip plate in ovoid apertures 20 formed in the granite. The granite table 14 is supported on bosses 22 above a mass or base 24, suitably comprising concrete sheathed in steel. Oil falling from the edge of the granite table 14 is captured in the granite-base gap 26 and recirculated from a sump not shown by pump means comprising the pressurized oil supply represented schematically.

Figure 3:
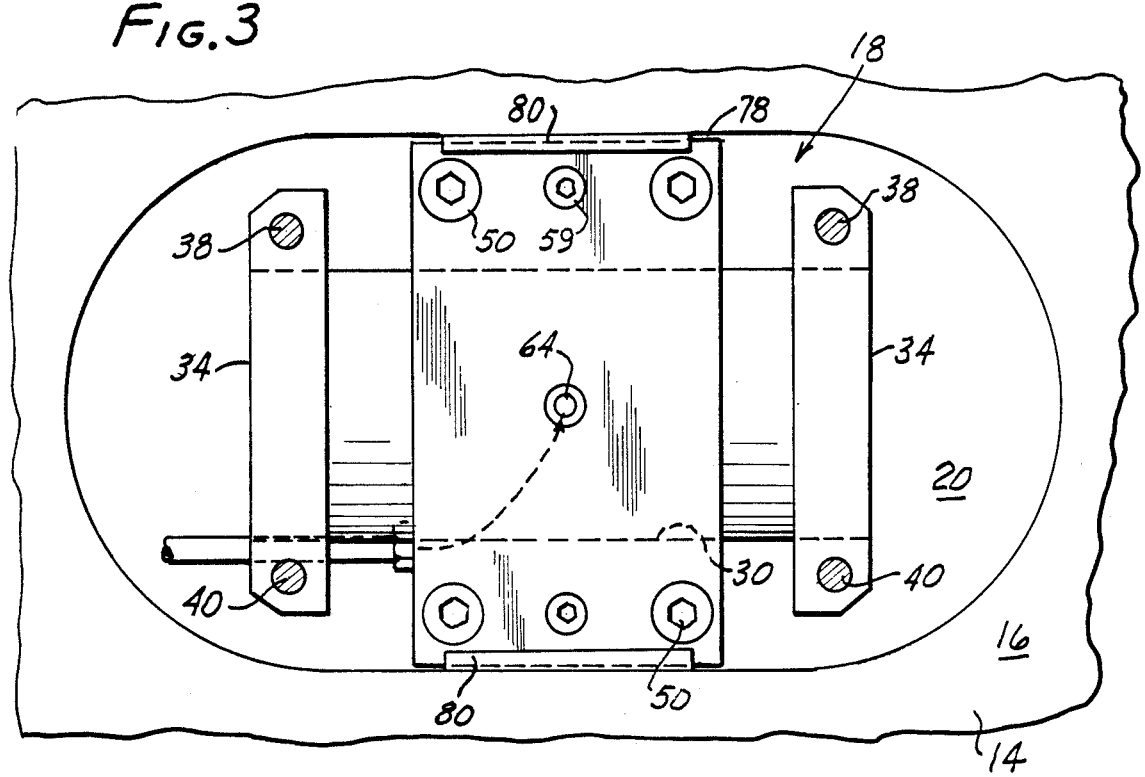
FIG. 3 is a top plan view of the invention hydrostatic journal bearing, installed in a granite table aperture.
Figure 6:
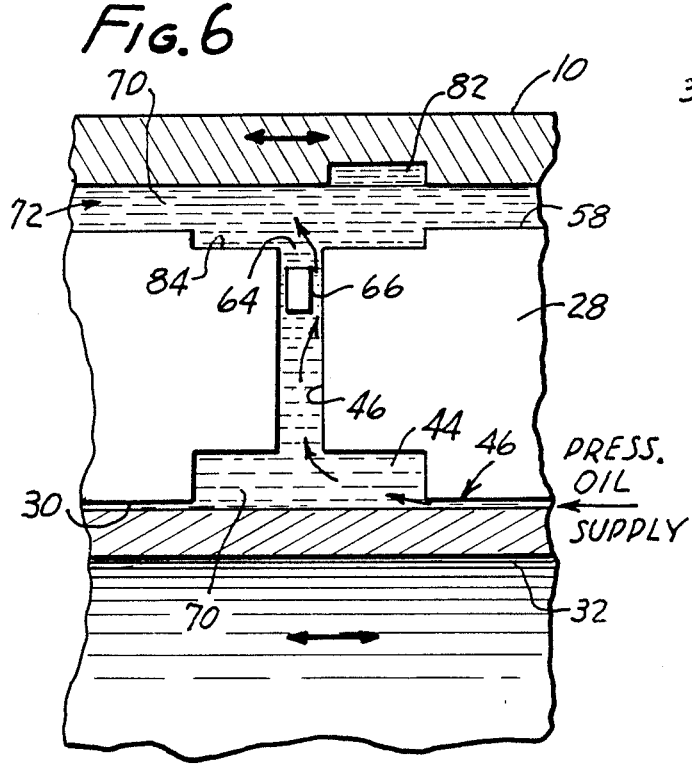
FIG. 6 is a fragmentary detail view, greatly enlarged of the housing passage and housing surface oil film; and, FIG. 7 is a fragmentary detail view like that of Fig. 4, of an alternate form of the invention.

The hydrostatic journal bearing 18, best shown in FIGS. 3 and 6, includes a housing 28 which is preferably formed of cast iron so as to be relatively porous for oil assimilation on its surfaces in its bore 30 and opposite the slip plate 10 as will be seen, shaft 32 which is preferably formed of tubular steel for strength and chrome plated for minimum friction in the housing bore. The housing 28 defines the pillow block of the bearing 18 and journals the shaft 32 for axial, longitudinal motion in guiding relation to the slip plate 10 which is subject to large forces on a reciprocating basis from the shaker S and is restrained from spurious motion by the bearing by means of the connection of the slip plate to the bearing shaft 32 by carriage blocks 34. Carriage blocks 34 are used in pairs as shown on opposite sides of the housing 28, their relative spacing determining the bearing stroke. As noted elsewhere, the present bearing 18 has preferably a minimum 2.5 inch stroke where the shaker S makes such a long stroke available. Carriage blocks 34 are split blocks which are joined beneath the shaft 32 by bolt fastener 36. The upper end of carriage blocks 34 if flat for lying flush against the underside of the slip plate 10, as shown, and tapped for receiving a pair of fastening bolts 38 extending through the slip plate 10 and into tapped holes 40. The slip plate 10 is thus attached to the bearing 18 by threaded connection via bolts 38 to the carriage blocks 34, which are in turn fixed to the shaft 32 by fastener 36 for transmitting the loading on the carriage blocks to the housing 28 via bore 30.

The bore 30 is oil pressurized by the pressurized oil supply, shown schematically, by feeding pressurized oil at pressures in excess of 2000 pounds per square inch typically, through interior hose 42 which is in open comunication with bore 30. With reference to FIG. 6, particularly, the oil from hose 42 fills the annulus 44 which is centrally located in the bore 30, and flows thence to the shaft surface-bore wall interspace 46 which is a mechanical clearance. The bore annulus 44 is in open communication with the housing passage 46, for purposes to appear.

The housing 28 transmits the load imposed on it to the base 24 to which the housing is mounted. Uniquely in the invention design, the housing 28 is elevated above the base 24 and carried stilt-like on four elongated bolts 50 at the corners of the generally rectangular housing. The bolts 50 are threaded through holes 52 in the housing 28, and extend from the housing at a tapered portion thereof at 54, to enter tapped holes 56 in the base 24 into which they are threaded more or less depending on the elevation desired for the housing for purposes of varying the oil film between the slip plate 10 and the housing surface 58 as will be later described.

The bolts 50 while rigid have enough flexibility to permit the housing to deflect laterally, i.e. normal to the direction of movement of shaft 32, providing a second degree of freedom in the bearing beyond the shaft-axis freedom. With reference to FIG. 1, the importance of this feature will be explained. In FIG. 1 seven bearings are shown, three on the center line of the slip plate and two each on the left and right hand sides of the slip plate. Lateral loads such as can be caused by the expansion of the slip plate 10 are different for the outer bearings than for the center bearings but can be taken up by the slight deflection of the outer bearings by movement of the housings 28 on their bolt supports. The movement is demand responsive and no more than necessary to accommodate the lateral loading, and left or right direction is immaterial.

Typically the bolts 50 are tensioned by relatively flexible set screws 59 (FIG. 4) which have enough flexibility to permit deflection of the housing 28, screws 59 being provided on two sides of the housing threaded into housing hole 61 and extending to the surface 58 of the housing for ease of adjustment.

Figure 7:
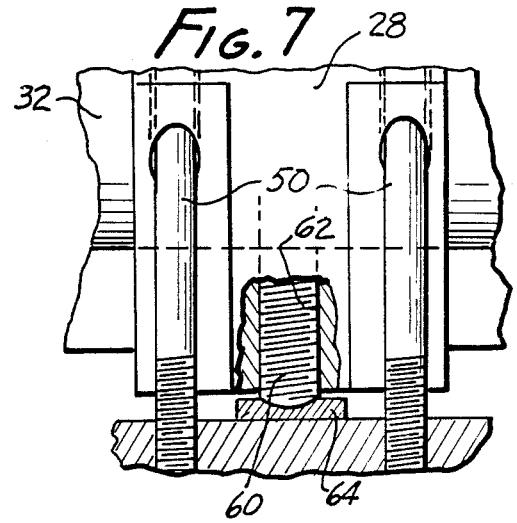

In situations where for test reasons no deflection is desired, the bolts 50 can be rigidified by tensioning them with another feature of the invention. With reference to FIG. 7, a relatively inflexible tensioning set screw 60 is shown threaded into housing hole 62 and extending to the surface 58 of the housing for ease of adjustment. Set screws 60 are provided on two sides of the housing, between the mounting bolts 50. A seat 64 is provided opposite set screws 59, 60 to preserve the base from damage as necessary. As will be evident, threaded adjustment downward of the set screws 59, 60 pushes the housing 28 upwardly, as the bolts 50 are holding it, resulting in a tensioning of the bolts 50, rigidifying them and controlling, indeed blocking deflection of the housing 28 in the case of the inflexible set screws 60, and making the bearing 18 a single degree of freedom bearing.

Figure 4:
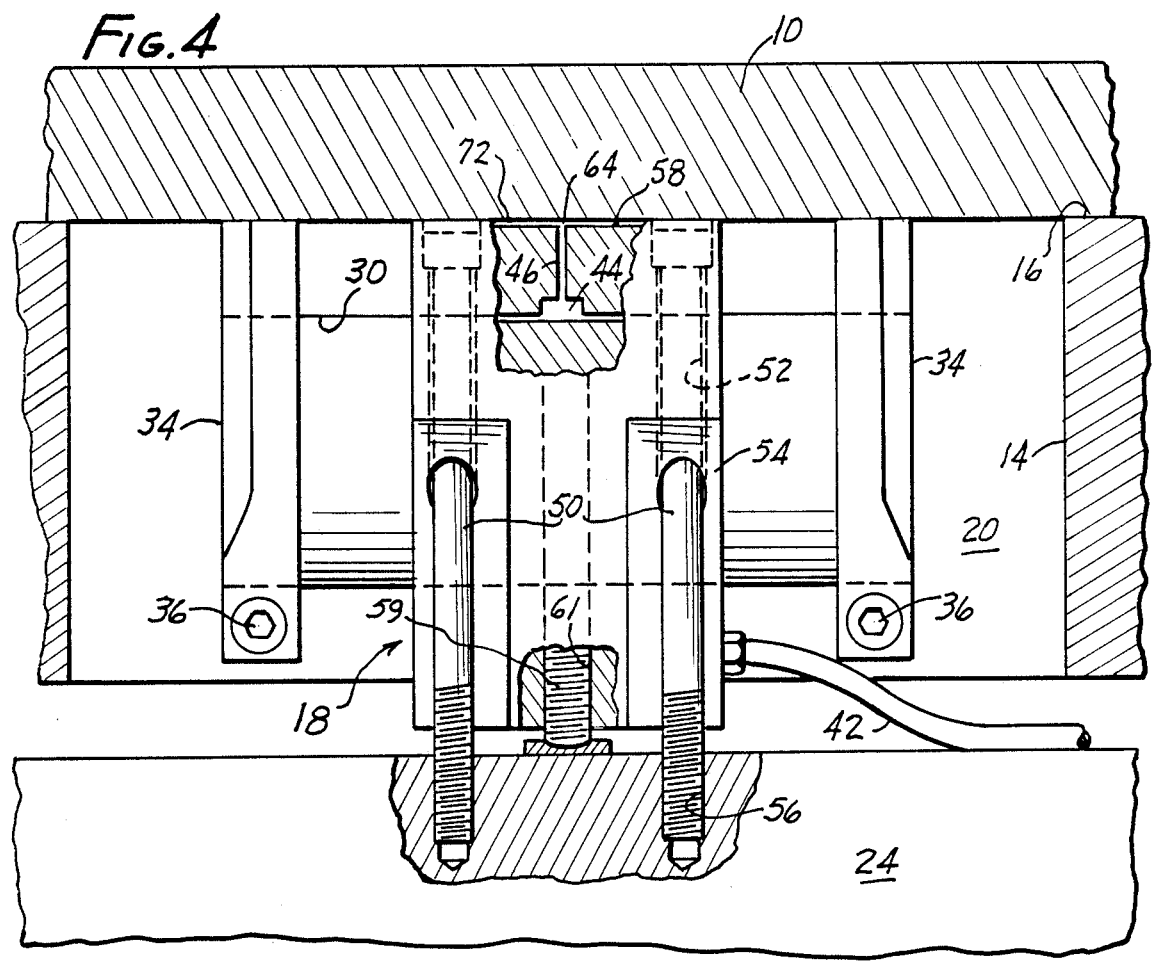
FIG. 4 is a side elevation view of the bearing shown in FIG. 3, partly broken away to show underlying parts.

With reference to FIGS. 3, 4 and 6, the formation of the oil film under the slip plate will be described. Initially, it will be recalled that the housing bore 30 is fed high pressure oil via hose 42. The bore annulus 44 is hydraulically filled as shown in FIG. 6. The housing passage 46 extends through the housing 28 from the annulus 44 to the surface 58 of the housing, the upper terminus of the passage defining a port 64, such that the housing surface is open to the bore 30 and the oil therein. Because the very high flows in the bearing bore 30 are not necessary at the housing surface 58, a flow restrictor 66 is mounted in the passage 46.

The oil 70 from the bore annulus 44 flows up the passage 46 and emerges from port 64 whence it spreads out over the housing surface 58. The slip plate 10 is spaced above the housing surface 57 by a gap 72 which in turn is determined by the height adjustment of the housing 28 on mounting bolts 50, and the relative height of carriage blocks 34 to the housing surface 58. In general the gap 72 is such as will allow formation of an oil film sufficient to operatively couple the housing surface 58 and the slip plate. This height is usually such as will put the housing surface 58 at approximately the height of the granite surface 16, which height permits an oil film between the slip plate and the granite surface.

A noted feature of the present invention is the absence of external hose lines and the absence of bores in the slip plate, both having previously been used to get oil to the granite surface 16. The use of bores in the slip plate means having to be careful about placing test article supporting inserts so as to not breach the bore. In addition, the drilling of long, small bore holes is expensive and may lead to excessive scrappage in production. A further disadvantage of feeding oil from the slip plate to the granite is the necessity of having O-ring sealed ports to the bearings which had to register with the oil flow bore for all different sizes of slip plate. Moreover, the previously used hoses get in the way of workers, are hazardous, and are often too lengthy for the job at hand because they must be usable an all sized of slip plates, including those not requiring long hoses.

In the present invention, the oil 70 is fed from the bore annulus 44; no external hoses are used; no sealing to the bearings is required; and, no gundrilled bores through the slip plate are needed.

These advantages flow from using the housing surface 58 to receive all the oil and transporting the oil from that locus to the granite by bridging the clearance 78 between the bearing housing 28 and the adjoining granite of aperture 20. With reference to FIG. 3, a pair of oil impervious, e.g. suitably oil resistant plastic, webs 80 are shown cantilevered from the housing surface 58 to be in sliding contact with the surrounding granite. The webs 80 may be above, at or slightly below the granite surface 16, provided the oil 70 flowing from the port 64 bridges the clearance 78 thereon. Of course other forms of oil delivery to the granite may be used.

The spreading of the oil 70 over the granite surface 16 is readily accomplished by providing grooving 82 in the underside of the slip plate. The exact configuration of the grooving 82 is not critical, but should be such as will distribute oil evenly and widely. For purposes of facilitating registration of the grooving 82 with the port 64, a trough 84 is advantageously provided in effect elongating the port and enabling continual open communication between the port and the grooving. See Fig. 6.

Figure 5:
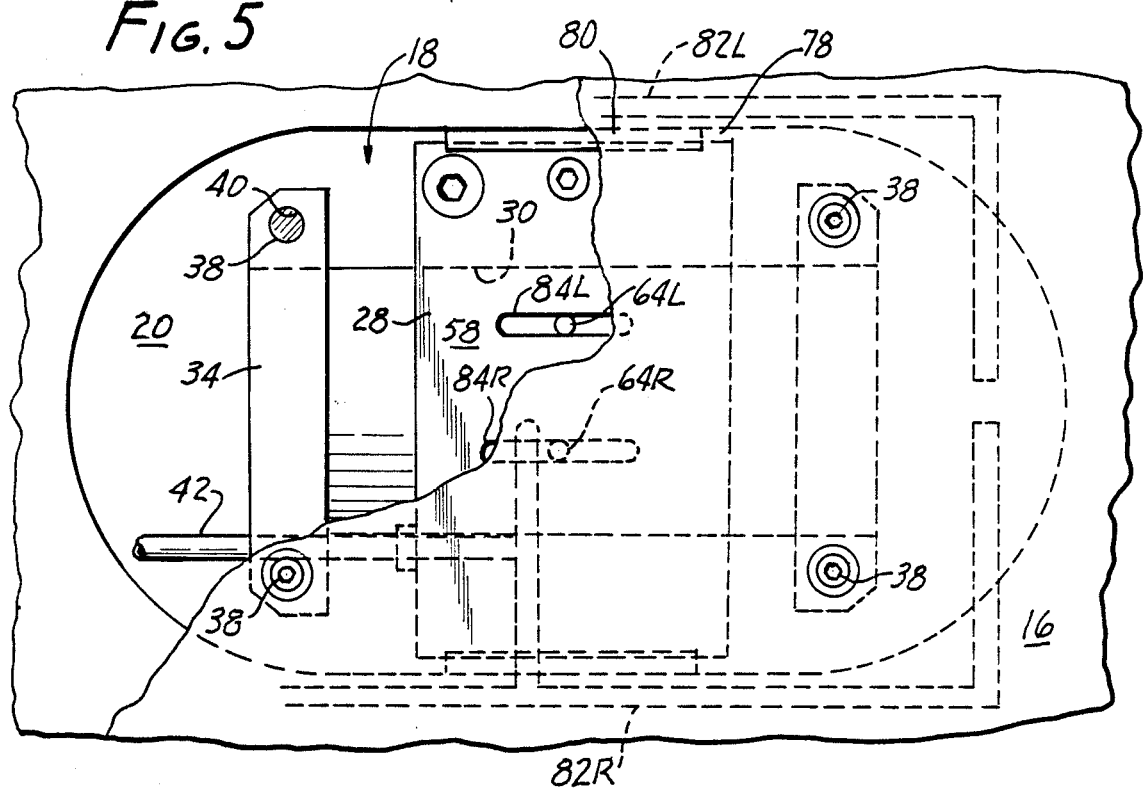
FIG. 5 is a view like FIG. 4 of a mofified form of the invention.

In the embodiment shown in FIG. 5, wherein like numbers to the other FIGS. indicate like parts, noncommunicating left and right hand patterns of grooving 82R, 82L are shown each communicating with its respective ports 64R, 64L and troughs 84R, 84L only, an arrangement enabling closer control of oil flow to the respective sides of the slip plate.

In operation, the slip plate 10 resting on granite 14 is fixed to the carriage blocks 34 which are fixed to the shaft 32 journaled in the housing 28 already positioned on the base 24 by bolts 50 to be at the desired height. Oil 70 is circulated to the bore 30 and thence to the housing surface 58 via passage 46 where a film is developed between the housing surface and the underside of slip plate 10. Additional oil 70 is passed to the surface 16 of the granite table 14 via webs 80. Movement of the slip plate 10 by the shaker S is guided by the bearing 18, and the slip plate damped by both the granite surface 16 oil film and the housing surface 58 oil film, whereby less area than heretofore is undamped, and less in fact that the area under the slip plate defined by the granite apertures 20.

A signal improvement in hydrostatic bearings is thus realized, as well as an important improvement in vibration test apparatus utilizing the bearing. The apparatus offering, in summary, the advantages of: internal oil feed paths in the bearing to the slip plate and the absence of external hoses which have been subject to damage by vibration stresses or accidental breakage; absence of drilled high oil pressure holes in the slip plate at a substantial cost saving, and enabling attachment of test articles practically anywhere on the plate; thicker available slip plates for heavier loads without sacrificing dynamic performance; a 50% increase in static loads over conventional designs; an over 80% increase in dynamic loads over conventional designs, up to 37,500 pounds per bearing at 5Hz. and above in some models; a doubling of the standard stroke length to 2.5 " without added cost of custom fabrication; less unsupported area beneath the slip plate by up to 20% and more depending on the specific configuration by virtue of the bearing housing supporting the plate, with resultant better dynamic response of the slip plate at high frequencies and better high load support at low frequencies; positive uniform coverage of the granite with the oil film through the restricted housing passage to the slip plate routing or grooving, without the restrictions being subjected to dynamic loads caused by vibration, and the availiability of one or two degrees of freedom for situations involving multiple bearings and e.g. varying temperature conditions.

We claim:

1. Vibration test apparatus having an extended stroke and improved stiffness for use with a plate mounting a test article for vibration testing, comprising a hydrostatic journal bearing plate guide having a housing mounted on a base, a shaft shiftable axially in said housing, carriage block means for connecting said shaft to said plate for movement relative to said housing in a plane including said shaft axis, and oil film means for operatively coupling said plate and a surface of said housing in vibration damping relation.

2. Vibration test apparatus according to claim 1, including an oil-pressurized bore in said housing in which said shaft is shiftable.

3. Vibration test apparatus according to claim 1, including also a pressurized oil supply, and passage means for pressurized oil to said housing surface.

4. Vibration test apparatus according to claim 1, in which said carriage block means comprises blocks on either side of said housing, disposed normally to the plane of said housing surface.

5. Vibration test apparatus according to claim 1, in which said shaft is tubular chrome-plated steel.

6. Vibration test apparatus according to claim 1, in which said housing surface is cast iron having a higher porosity to oil than said plate.

7. Vibration test apparatus according to claim 1, in which said carriage block means is free of attachment to said base, and said housing is free of attachment to said plate, said apparatus having first and second degrees of freedom.

8. Vibration test apparatus according to claim 1, in which axial shifting of said shaft defines the apparatus first degree of freedom, and including also selectively deflectable means mounting said housing to said base for movement of said apparatus in a direction normal to the axial shifting of said shaft as a second degree of freedom for said apparatus.

9. Vibration test apparatus according to claim 8, including also a series of elongated bolts mounting said housing to said base in spaced relation for accommodating said second degree of freedom as a function of the flexibility in said bolts.

10. Vibration test apparatus according to claim 9, including also means selectively tensioning said bolts in bolt flexibility decreasing relation.

11. Vibration test apparatus according to claim 1, in which said housing defines a bore, and including also a housing oil feed passage from said bore to said housing surface.

12. Vibration test apparatus having an extended stroke and improved stiffness for use with a plate mounting a test article for vibration testing, comprising a hydrostatic journal bearing plate guide having a housing mounted on a base, a shaft shiftable axially in said housing, carriage block means for connecting said shaft to said plate for movement relative to said housing parallel to said shaft axis, and oil film means including a pressurized oil supply and a housing oil flow passage from said supply to a surface of said housing opposite said plate whereby said surface is operatively coupled to said plate in vibration damping relation.

13. Vibration test apparatus according to claim 12, including a bore in said housing in which said shaft is shiftable, said bore being oil pressurized by said pressurized oil supply.

14. Vibration test apparatus according to claim 13, in which said housing passage is flow restricted against full oil supply flow at said surface.

15. Vibration test apparatus according to claim 14, in which said carriage block means comprises carriage blocks on either side of said housing, mounted transversely on said shaft, the relative spacing of said carriage block means defining the stroke of said apparatus.

16. Vibration test apparatus according to claim 15, in which said carriage block means is free of attachment to said base, and said housing is free of attachment to said plate, said apparatus having first and second degrees of freedom.

17. Vibration test apparatus according to claim 16, in which axial shifting of said shaft defines the apparatus first degree of freedom, and including also selectively deflectable means mounting said housing to said base for movement of said apparatus in a direction normal to the axial shifting of said shaft as a second degree of freedom for said apparatus.

18. Vibration test apparatus according to claim 17, including also a series of elongated bolts mounting said housing to said base in spaced relation for accommodating said second degree of freedom as a function of housing deflection provided by the flexibility in said bolts.

19. Vibration test apparatus according to claim 18, including also threaded adjustment means thread adjustable between said base and said housing in opposition to said elongated bolts for variably tensioning said bolts in bolt flexibility decreasing relation.

20. Vibration test apparatus according to claim 19, in which said shaft is tubular chrome-plated steel.

21. Vibration test apparatus according to claim 20, in which said housing is formed of cast iron having a porosity to oil for maintaining an oil lubricity between said housing surface and said plate and between said shaft and said housing bore.

22. Vibration test apparatus according to claim 21, including also oil distribution means on said housing surface in open communication with said housing passage.

23. Vibration test apparatus according to claim 1, in combination with static support means for said plate, said static support means comprising a table adapted to underlie said plate, said hydrostatic journal bearing guide being within the perimeter of said table in dynamic supporting relation with said plate.

24. Vibration test apparatus according to claim 12, in combination with static support means for said plate, said static support means comprising a table adapted to underlie said plate, said hydrostatic journal bearing guide being within the perimeter of said table in dynamic supporting relation with said plate.

25. Vibration test apparatus according to claim 24, in which said table defines a through opening extending between said base and said plate, said apparatus being guide being positioned in said opening.

26. Vibration test apparatus according to claim 25, in which said housing oil flow passage extends form a housing bore journaling said shaft to said housing surface opposite said plate.

27. Vibration test apparatus according to claim 26, in which said housing surface is spaced from said table and said oil film means further includes means to transfer oil between said table and said housing surface, said means comprising an oil impervious web extending between said housing and said table.

28. Vibration test apparatus according to claim 27, in combination with a test article support plate, said plate having a pattern of grooving opposite said table to define an oil flow path across said table between said table and said plate.

29. Vibration test apparatus according to claim 28, said housing passage terminates in a housing surface port, said plate grooving registering with said port in oil flow facilitating relation from port to table.

30. Vibration test apparatus according to claim 29, including a plurality of said housing ports in spaced relation, said plate having separate patterns of grooving in registration with one or another of said ports.

31. Vibration test apparatus according to claim 29, in which said port is longitudinally extended beyond said passage in said housing surface.

32. Vibration test apparatus according to claim 29, including also flow restriction means at said housing port to limit oil flow to said housing surface to that needed to maintain a predetermined desired oil film between said plate and said housing and table respectively.

33. Vibration test apparatus according to claim 24, including also a web extending between said housing and said table in oil carrying relation.

34. In combination with vibration test apparatus according to claim 24, a plate adapted to carry a test article in table supported relation fixed to carriage block means joined to a hydrostatic journal bearing shaft movable translationally in a housing, said housing having an oil passage terminating in housing surface port means, said plate having discontinuous patterns of oil distributing grooving opposite said housing and table, each of said patterns being separately adapted to continuously register with said housing surface port means.

35. Vibration test apparatus according to claim 34, in which said plate has noncommunicating left and right hand grooving patterns, said housing having left and right hand port means arranged whereby each of said grooving patterns registers with its respective housing port means only.

36. Hydrostatic journal bearing adapted for supporting a test article-carrying slip plate in guiding relation, said bearing comprising a pressurized oil supply, a pillow block housing having an oil pressurizable bore and an oil film-covered surface opposed to said slip plate, a shaft journaled in said bore, and carriage block means for carrying said slip plate, said carriage block means being mounted on said shaft and fixed to said slip plate, said pillow block housing being movable relative to said slip plate and operatively coupled therewith through said oil film covering said pillow block housing surface in vibration damping relation.

37. Hydrostatic journal bearing according to claim 36, in which said pillow block housing surface comprises an oil retaining porous cast iron.

38. Hydrostatic journal bearing according to claim 36 in which said shaft comprises tubular steel.

39. Hydrostatic journal bearing according to claim 38, in which said pillow block housing surface comprises an oil retaining porous cast iron.

40. Hydrostatic journal bearing according to claim 36, including also a plurality of mounting bolts mounting said pillow block housing to a base in adjustably spaced relation to said slip plate.

41. Hydrostatic journal bearing according to claim 40, in which said mounting bolts extends from said pillow block housing to said base, said bolts being thread connected to said base and said pillow block housing, whereby the spacing between said pillow block and said base is thread adjustable.

42. Hydrostatic journal bearing according to claim 41, in which said pillow block housing is generally rectangular in a plane parallel to the longitudinal axis of said shaft, said mounting bolts are located one at each of the corners of said pillow block housing, and including also bolt tensioning means adapted to bodily shift said pillow block housing against the force of said mounting bolts, said tensioning means being located between adjacent mounting bolts.

43. Hydrostatic journal bearing according to claim 42, in which said tensioning means is thread adjustable relative to said pillow block housing and adapted to bear against said base in mounting bolt tensioning relation.

44. Hydrostatic journal bearing according to claim 43, including also seating means for said tensioning means at said base.

45. Hydrostatic journal bearing according to claim 36, in which said carriage block means comprises first and second carriage blocks opposed to opposite ends of said pillow block housing bore.

46. Hydrostatic journal bearing according to claim 45, in which said carriage block means define a split bore for receiving said shaft, and including also fasteners to close said split bore against said shaft.

47. Hydrostatic journal bearing according to claim 36, in which said pillow block housing surface and said housing bore are in open communication with said oil supply and each other, whereby said housing bore is pressurized and said housing surface is fed film forming amounts of oil.

48. Hydrostatic journal bearing according to claim 47, in which said pillow block housing defines a passage from said bore to said surface for oil flow from said bore to said surface, said passage being restricted to meter oil flow to said housing surface to an amount operatively coupling said slip plate and said housing surface in damping relation without increasing the predetermined spacing between said said plate and said housing surface.

49. Hydrostatic journal bearing according to claim 48, in which said bore defines a central annulus, said oil supply feeding said annulus to oil pressurize said bore, said passage intersecting said bore in oil flow receiving relation.

50. Hydrostatic journal bearing according to claim 49, in combination with a slip plate, and a static slip plate support comprising polished granite, and means passing oil from said supply from said housing surface to between said granite support and said slip plate.

51. Vibration test apparatus comprising an apertured granite block adapted to support a slip plate in oil-damped relation, and a hydrostatic journal bearing within the block aperture operatively coupled to said slip plate by an oil film, whereby the block non-damped portions of said slip plate corresponding to the apertured areas of said block are damped by said housing oil film, whereby the nondamped area of said slip plate is smaller than the area of said block aperture.

52. Vibration test apparatus comprising a granite block having at least one journal bearing receiving aperture and a smooth surface surrounding said aperture, said surface being adapted to support a slip plate in sliding relation coupled to a vibration source, a base supporting said granite block, at least one hydrostatic journal bearing in an aperture of said granite, said hydrostatic journal bearing being smaller than said aperture to define therewith an aperture clearance and comprising a pillow block housing defining a bore and a surface opposite said slip plate, a shaft journaled in said bore, an oil supply adapted to supply oil under pressure to said bore, an oil passage through said housing between said bore and said housing surface, said passage being adapted to convey oil at reduced rates of flow from said bore to said housing surface; carriage blocks at either side of said housing fixed to said shaft at a predetermined combined clearance relative to said housing of not less than 2.5 inches, said carriage blocks being fixed to said slip plate in a manner elevating said slip plate slightly above said granite block, said housing surface being lower than the height of said slip plate to damp said slip plate vibration at said housing surface, a pair of oil transferring webs carried by said housing in sliding contact with said granite block opposite said slip plate for transferring oil flowing on said housing surface across said aperture clearance to said granite surface in slip plate movement facilitating relation, longitudinally extended trough means in said housing surface, grooving in said slip plate surface, said trough and grooving being continuously in registration for movement of flowing oil from said trough to said slip plate grooving in web supported relation across said aperture clearance to damp said slip plate beyond said apertures; said housing being mounted to said base in spaced relation to said slip plate by a series of mounting bolts adapted to adjust said gap width, said mounting bolts being flexible over their exposed length between housing and base to permit transverse shifting of said housing within said aperture as well as axial motion of said shaft within said aperture, whereby said bearing has two degrees of freedom, and means to tension said bolts.

53. Method of vibration testing a test article, including supporting the article for vibratory motion on a plate, connecting said plate to a hydrostatic journal bearing in supporting and guiding relation, forming an oil film on a plate-opposing surface of a hydrostatic bearing housing, coupling a pair of carriage blocks between the hydrostatic bearing shaft and said plate in a manner defining a gap between said plate and said housing surface, and movably supporting the plate on said oil film, whereby the vibration induced in said plate is damped by said housing surface oil film.

* * * * *